(12) United States Patent
Yoshida et al.

(10) Patent No.: US 8,267,236 B2
(45) Date of Patent: Sep. 18, 2012

(54) ELECTROMAGNETIC CLUTCH

(75) Inventors: Shinichi Yoshida, Kanagawa (JP);
Takanobu Koyama, Tokyo (JP);
Yoshikazu Saka, Tokyo (JP)

(73) Assignee: Minebea Co., Ltd., Nagano (JP)

( * ) Notice: Subject to any disclaimer, the term of this patent is extended or adjusted under 35 U.S.C. 154(b) by 732 days.

(21) Appl. No.: 12/169,894

(22) Filed: Jul. 9, 2008

(65) Prior Publication Data

US 2009/0032357 A1 Feb. 5, 2009

(30) Foreign Application Priority Data

Jul. 31, 2007 (JP) ................................ 2007-198648

(51) Int. Cl.
*F16D 27/112* (2006.01)
(52) U.S. Cl. .................................. 192/84.961; 192/200
(58) Field of Classification Search ............... 192/84.94, 192/84.961, 200, 84.9, 84.95, 84.951, 84.96
See application file for complete search history.

(56) References Cited

U.S. PATENT DOCUMENTS

| | | | | |
|---|---|---|---|---|
| 3,036,679 | A * | 5/1962 | Millington et al. | 192/84.94 |
| 4,498,066 | A * | 2/1985 | Fujiwara et al. | 335/281 |
| 4,566,576 | A * | 1/1986 | Moriya et al. | 192/84.961 |
| 5,036,964 | A * | 8/1991 | Booth et al. | 192/84.5 |
| 5,080,214 | A * | 1/1992 | Fossum | 192/84.92 |
| 2005/0183924 | A1* | 8/2005 | Fukumoto et al. | 192/84.961 |
| 2006/0219514 | A1 | 10/2006 | Matsumura et al. | |
| 2008/0142332 | A1* | 6/2008 | Koyama et al. | 192/84.961 |

FOREIGN PATENT DOCUMENTS

| | | | |
|---|---|---|---|
| JP | 54156950 A | * | 12/1979 |
| JP | 59047538 A | * | 3/1984 |
| JP | 59-72323 U | | 5/1984 |
| JP | 8-128479 A | | 5/1996 |
| JP | A 10-148224 | | 6/1998 |
| JP | A 11-082553 | | 3/1999 |
| JP | A 2001-116062 | | 4/2001 |
| JP | 2007-9948 A | | 1/2007 |
| JP | 2007-16818 A | | 1/2007 |
| JP | 2007-120689 A | | 5/2007 |

OTHER PUBLICATIONS

Sep. 30, 2011 Office Action issued in Japanese patent application No. 2007-198648 (with translation).

* cited by examiner

*Primary Examiner* — Richard M. Lorence
(74) *Attorney, Agent, or Firm* — Oliff & Berridge, PLC

(57) ABSTRACT

An electromagnetic clutch comprises a rotor rotatable with respect to the center of rotation, an armature facing the rotor with a clearance, a device for generating a magnetic attracting force between the rotor and the armature, a rotating member transmitting a driving force from the armature, and a plate spring for mounting the armature on the rotating member. The plate spring extends in a direction opposite to the center of rotation and has a first end separated from the center of rotation. The first end or a portion in the vicinity of the first end contacts an armature surface facing the rotor, and the plate spring is fixed to the rotating member at a portion other than the portion contacting the armature surface. The armature is supported such that the armature is urged to be separated in a direction opposite to the rotor by an elasticity of the plate spring.

6 Claims, 4 Drawing Sheets

ELECTROMAGNETIC CLUTCH

RELATED APPLICATIONS

This application claims priority under 35 U.S.C. §119 to Japanese Patent Application No. JP2007-198648 filed on Jul. 31, 2007, the entire content of which is hereby incorporated by reference.

BACKGROUND OF THE INVENTION

1. Field of the Invention

The present invention relates to an electromagnetic clutch having a specific structure for transmitting a driving force and/or a specific structure for supporting a friction member.

2. Description of the Related Art

An electromagnetic clutch is known as a clutch which is engaged and is disengaged by a magnetic force. In this electromagnetic clutch, a magnetic force is generated by an electromagnetic coil, and an armature (friction plate) and a rotor are attracted with each other by the magnetic force. Thus, a friction force is generated between the rotor and the armature, and a driving force (torque) is thereby transmitted. When an electric current is turned off and is not fed to the electromagnetic coil, the armature is separated from the rotor, and the transmission of the driving force is thereby interrupted.

In the above operation, the armature must be supported so as to be separated from the rotor when the clutch is disengaged. In order to satisfy this requirement, the armature is supported by a plate spring so that the plate spring is deformed by a magnetic attracting force, and so that the armature moves toward the rotor and contacts the rotor when the clutch is engaged. For example, an electromagnetic clutch is disclosed in Japanese Unexamined Patent Application Laid-open No. 2007-016818.

FIG. 6 is a perspective view showing an example of a structure for supporting an armature in a conventional technique. FIG. 6 shows a reference numeral 701 that indicates a fixing member to be fixed to a rotating shaft (not shown in the figure). The fixing member 701 comprises a planar (flanged) fixing surface at a portion that cannot be seen in the figure, and a plate spring 703 is fixed on a fixing surface by rivets 702. An armature 705 is fixed to the plate spring 703 by rivets 704. According to this structure, when the armature 705 is attracted to the back side of the figure by a magnetic force, the plate spring 703 is elastically deformed, and the armature 705 is slightly moved in the axial direction. When the magnetic force is removed, the armature 705 returns to the former position by the springback force of the elastic deformation of the plate spring 703.

The above plate spring 703 is fixed to the armature 705 by the rivets 704 so as to ensure the strength for transmitting a driving force to the rotating shaft. This structure requires many parts and assembly steps, and production costs are therefore high. Specifically, in a method for fixing a plate spring by rivets, special tools are required for fixing the rivets, and the operation is therefore complicated.

An electromagnetic clutch is provided with members at the inside thereof, and the members may rotate when the clutch is operated. In order to design a compact clutch, the rotating members must be disposed so as not to contact other members. Accordingly, the accuracy of positioning of the members in the axial direction of the rotating shaft is important. There may be a case in which a rotation angle-measuring device for measuring a rotation angle and a rotation direction is mounted on the rotating shaft. In this case, in order to maintain measurement accuracy, backlash in the axial direction (thrust gap) should be reduced as much as possible.

In order to reduce the backlash in the axial direction, a thin annular spacer called a "shim" is conventionally used, and the shim is passed through a shaft member. The number of shims is adjusted with respect to each device by hand working so that the backlash is reduced. Such a structure using shims requires a large number of parts, and the number of adjustment operations and assembling operations are increased, whereby the production cost is increased.

Output of an electromagnetic clutch is transmitted to the outside by a pulley, and a driving force is transmitted from an armature to a pulley through a rotating shaft. In this case, in order to transmit a driving force to the rotating shaft having a smaller diameter than those of other parts, and to bring out the driving force from the rotating shaft, gears and parts are required. The gears should be formed with high processing accuracy, and the parts should have a high strength (for example, they should be sintered members), thereby increasing the production cost.

SUMMARY OF THE INVENTION

In view of the above circumstances, it is an object of the present invention to provide a structure for supporting an armature by a plate spring, in which rivets are not required. Another object of the present invention is to provide an electromagnetic clutch comprising a structure for inhibiting backlash in the axial direction at a low cost. Moreover, another object of the present invention is to provide an electromagnetic clutch comprising a structure for transmitting a driving force, in which expensive sintered members and members with high processing cost are not required.

According to a first aspect of the present invention, an electromagnetic clutch comprises a rotor rotatable with respect to the center of rotation, an armature facing the rotor with a clearance, a device for generating a magnetic attracting force between the rotor and the armature, a rotating member transmitting a driving force from the armature, and a plate spring for mounting the armature on the rotating member. The plate spring extends in a direction opposite to the center of rotation and has a first end separated from the center of rotation. The first end or a portion in the vicinity of the first end, contacts an armature surface facing the rotor, and the plate spring is fixed to the rotating member at a portion other than the portion contacting the armature surface. The armature is supported such that the armature is urged to be separated in a direction opposite to the rotor by an elastic force of the plate spring.

According to the first aspect of the present invention, a structure for elastically supporting an armature by a plate spring (structure for elastically supporting an armature separately from a rotor) can be obtained without using a fixing means such as a rivet or a welding. That is, the end (or the vicinity of the end) of the plate spring that is opposite to the center of rotation contacts the surface (that is, a friction surface) of the armature. Moreover, the plate spring is fixed to the rotating member at a portion other than the portion that contacts the surface of the armature. Thus, the armature is supported such that the armature is urged to be separated in the direction opposite to the rotor and is urged toward the rotating member by an elastic force of the plate spring. Therefore, by using the plate spring instead of a fixing means such as a rivet and a welding, the armature can be elastically supported separately from the rotor.

In the first aspect of the present invention, the center of rotation is defined as an axis of an imaginary center of rotation, and the axis may be a virtual member or may exist as a shaft member. The rotating member is a member that is relatively rotatable with respect to the center of rotation, and a member rotatable with respect to a shaft at the center of rotation, and the rotating shaft itself may be used as the rotating member.

According to a second aspect of the present invention, the plate spring comprises a second end at the side of the center of rotation, and the electromagnetic clutch further comprises a slide-preventing means for preventing the second end or a portion in the vicinity of the second end from sliding to the rotor. The plate spring is pressed from the rotating member toward the rotor at a portion other than the portions of the first end or the vicinity of the first end and the second end or the vicinity of the second end.

According to the second aspect of the present invention, the second end or the vicinity of the second end is prevented from sliding to the rotor by the slide-preventing means. In the plate spring, when a pressure is applied from the rotating member toward the rotor, a reaction force in a portion being applied the pressure is generated due to an elastic force of the plate spring. The reaction force acts from the plate spring to the rotating member at the portion and functions as a force that urges the rotating member to be separated in a direction opposite to the rotor. This pressure urges the rotating member to be separated in a direction opposite to the rotor, whereby backlash in the axial direction can be reduced.

In the second aspect of the present invention, a spacer and additional parts are not required, and an electromagnetic clutch can thereby be produced at a lower cost. The rotating member is urged to be separated in the axial direction by an elastic force of the plate spring, whereby backlash in the axial direction is reduced. Therefore, an adjustment (adjustment using spacers) in an assembly process can be omitted, and a product is thereby produced at a lower cost.

According to a third aspect of the present invention, an electromagnetic clutch comprises a shaft member, a rotor supported so as to be rotatable with respect to the shaft member, an armature facing the rotor with a clearance, a device for generating a magnetic attracting force between the rotor and the armature, and a rotating member. The rotating member is supported so as to be rotatable with respect to the shaft member and is coupled with the armature through a plate spring.

According to the third aspect of the present invention, a driving force can be transmitted by the rotating member without passing through the shaft member. The rotating member may have a larger diameter, and an area for transmitting a driving force can thereby be increased. Therefore, the rotating member and the member to which a driving force is transmitted from the rotating member, need not be great. Accordingly, expensive sintered members and members with high processing cost are not required, and a member formed at a lower cost (for example, a resin member obtained by molding) can be used. As a result, an electromagnetic clutch can be produced at a lower cost. In this structure, the shaft member functions as a member for securing the center of rotation, and a transmitting function of a driving force is not required. Therefore, the strength required for the shaft member may be lower compared to the structure in which a shaft is used to transmit a driving force, and a material obtained and processed at a lower cost can be used.

According to a fourth aspect of the present invention, the electromagnetic clutch further comprises a pulley that is coupled with the rotating member. According to the fourth aspect of the present invention, a driving force can be outputted through the pulley. As mentioned above, the rotating member may have a larger diameter. Therefore, even when the rotating member and the pulley are, for example, made of resin members, a transmission structure of a driving force may have sufficient strength so as not to be damaged.

According to a fifth aspect of the present invention, the plate spring extends in a direction opposite to the shaft member and comprises a first end separated from the shaft member. The first end or a portion in the vicinity of the first end, contacts an armature surface facing the rotor, and the plate spring is fixed to the rotating member at a portion other than the portion contacting the armature surface. The armature is supported such that the armature is urged to be separated in a direction opposite to the rotor by an elastic force of the plate spring. According to the fifth aspect of the present invention, the third aspect of the present invention can provide advantages to the first aspect of the present invention.

According to a sixth aspect of the present invention, the plate spring comprises a second end at the side of the shaft member, and the electromagnetic clutch further comprises a slide-preventing means for preventing the second end or a portion in the vicinity of the second end from sliding to the rotor. The plate spring is pressed from the rotating member toward the rotor at a portion other than the portions of the first end or the vicinity of the first end and the second end or the vicinity of the second end. According to the sixth aspect of the present invention, the third aspect of the present invention can provide advantages to the second aspect of the present invention.

According to a seventh aspect of the present invention, the armature is provided with a slit around the circumferential direction, and the rotating member comprises a protuberance that engages with the slit. According to the seventh aspect of the present invention, the rotation of the armature is transmitted to the rotating member through the protuberance inserted into the slit of the armature.

Providing a slit around the circumferential direction of the armature is effective for efficiently obtaining the function of the clutch. By providing the slit, a magnetic path is formed in a winding manner in a cross section, and an attracting force between the rotor and the armature effectively affects. In the seventh aspect of the present invention, the slit is provided so as to form the winding magnetic path, and a driving force is transmitted from the armature to the rotating member by using the slit. Thus, a plate spring is not required to transmit a driving force (or is not required to transmit all of the driving force), whereby an electromagnetic clutch which transmits a large driving force can be obtained even when the structure thereof has an armature and a plate spring that are not fixed by rivets. A driving force is not transmitted through a plate spring (or is not transmitted in full through a plate spring), whereby a plate spring does not require a strength that is necessary when a driving force is transmitted only by the plate spring. The plate spring is not required to transmit a large driving force. Therefore, the plate spring may have reduced thickness and outer diameter, and the material cost is thereby decreased.

According to an eighth aspect of the present invention, an electromagnetic clutch comprises a rotor rotatable with respect to the center of rotation, an armature facing the rotor with a clearance, a device for generating a magnetic attracting force between the rotor and the armature, and a rotating member transmitting a driving force from the armature. The armature is provided with a slit around the circumferential direction, and the rotating member comprises a protuberance which engages with the slit.

According to a ninth aspect of the present invention, the electromagnetic clutch further comprises a worm wheel that is coupled with the rotor and has a cylindrical member for covering the outer circumferential surface of the clearance between the armature and the rotor. According to the ninth aspect of the present invention, the outer circumferential surfaces of the fiction surfaces of the rotor and the armature are covered with the cylindrical member. Therefore, when metal particles are generated at the friction surfaces, the metal particles are prevented from being entered in the gear portion of the worm wheel. Accordingly, wear and inappropriate engagement of the worm and the gear portion can be avoided.

According to the first aspect of the present invention, the present invention provides an electromagnetic clutch having a structure for supporting an armature by a plate spring, in which rivets are not required. According to the second aspect of the present invention, the present invention provides an electromagnetic clutch in which backlash in the axial direction can be reduced at a lower cost. According to the third aspect of the present invention, the present invention provides an electromagnetic clutch having a structure for transmitting a driving force, in which expensive sintered members and members with high processing cost are not required. According to the fourth aspect of the present invention, an electromagnetic clutch which outputs a driving force by a pulley can be obtained.

According to the fifth aspect of the present invention, in the electromagnetic clutch using the third aspect of the present invention, a structure for supporting a plate spring, in which rivets are not required, can be provided. According to the sixth aspect of the present invention, in the electromagnetic clutch using the fifth aspect of the present invention, backlash in the axial direction can be reduced at a lower cost. According to the seventh aspect of the present invention, in the electromagnetic clutch, a driving force can be transmitted from the armature to the rotating member without using the plate spring (or in a condition in which the plate spring is not required to transmit all of the driving force). Therefore, the material cost of the plate spring and the cost for affixing the plate spring can be decreased. According to the eighth aspect of the present invention, by using the slit provided to the armature, a function of the armature for efficiently transmitting a driving force can be obtained. According to the ninth aspect of the present invention, the electromagnetic clutch provides a structure in which metal particles generated at friction surfaces of the rotor and the armature are not easily entered between the worm and the gear portion.

DETAILED DESCRIPTION OF THE PREFERRED EMBODIMENTS

Preferred embodiments will hereinafter be described in detail with reference to the drawings.

(1) First Embodiment

Structure of Electromagnetic Clutch

Figure 1:
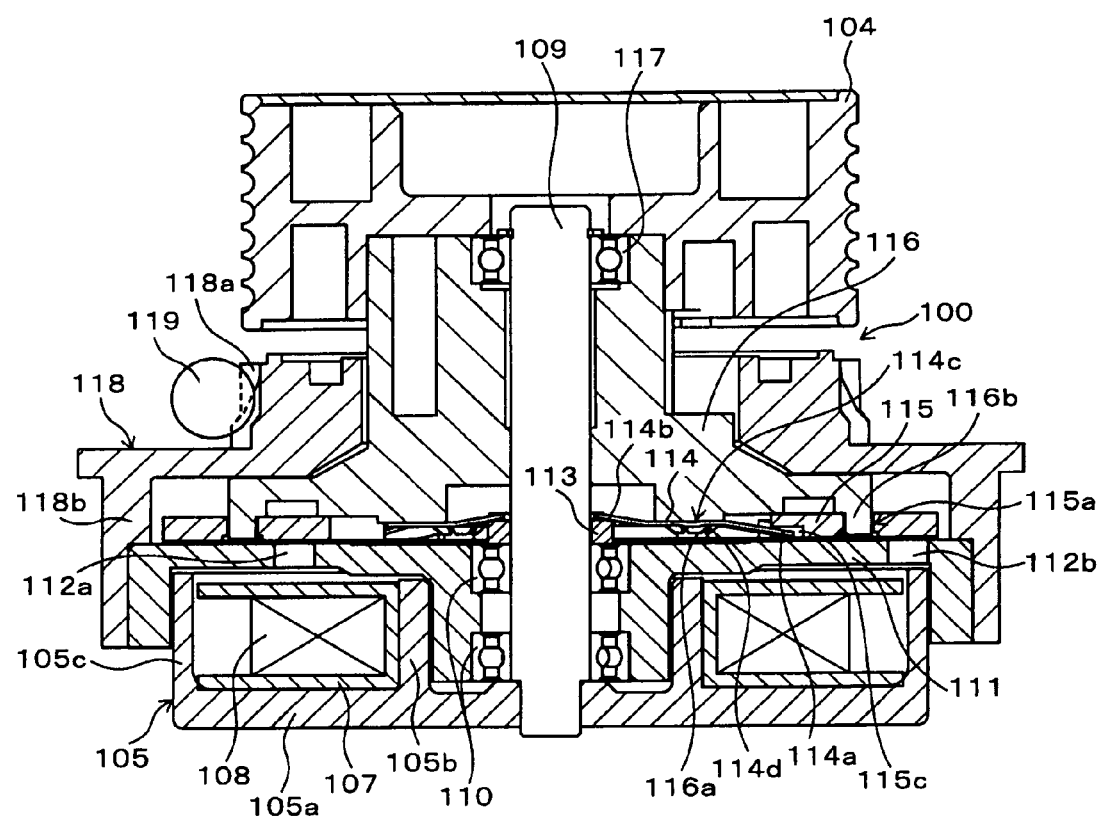
FIG. 1 is a cross sectional view showing an example of an electromagnetic clutch of the present invention.

FIG. 1 is a cross sectional view showing an example of an electromagnetic clutch using the present invention. FIG. 1 shows an electromagnetic clutch 100 in which a housing 105 is fixed to an exterior member (casing) (not shown in the figure), and a pulley 104 is disposed at the top portion thereof.

The housing 105 comprises a disk-shaped plate portion 105a, an inner cylindrical portion 105b, and an outer cylindrical portion 105c. There is a space between the inner cylindrical portion 105b and the outer cylindrical portion 105c, and an electromagnetic coil 108 as an example of a device for generating a magnetic force is accommodated in the space. The electromagnetic coil 108 has a conductive wire that is wound around a bobbin 107 so as to have a solenoid shape. When a DC voltage is applied from a current-fed circuit (not shown in the figure) to the electromagnetic coil 108, a magnetic force is generated. When an electric current is turned off, the generation of the magnetic force stops.

The housing 105 is formed with a hole at the center of the bottom. A shaft member 109 is press-fitted into the hole. The shaft member 109 is made of a metal material that is rigid, the rigidity being necessary for maintaining the center of rotation. A rotor 111 is secured to the shaft member 109 through a bearing 110 and is rotatable with respect to the shaft member 109. The housing 105 is made of a magnetic material, and the rotor 111 is also made of a magnetic material and is disposed at a position at which the rotor 111 does not contact the housing 105. Slits 112a and 112b are formed in the rotor 111 around the circumferential direction thereof and extend in the circumferential direction. The slits 112a and 112b are divided into several portions by bridge portions, and the bridge portions maintain the rotor 111 as one body.

The shaft member 109 passes through a spacer 113, and the spacer 113 contacts the upper portion of the bearing 110. The spacer 113 has a cylindrical shape, and an inner claw 114b of a plate spring 114 contacts the upper end of the spacer 113. The spacer 113 functions as a slide-preventing means for preventing the vicinity of the end portion of the inner claw 114b of the plate spring 114 from sliding to the rotor 111. The plate spring 114 is fixed to a driving boss 116 by a so-called push-nut structure, the driving boss 116 being an example of a rotating member of the present invention.

Figure 2:
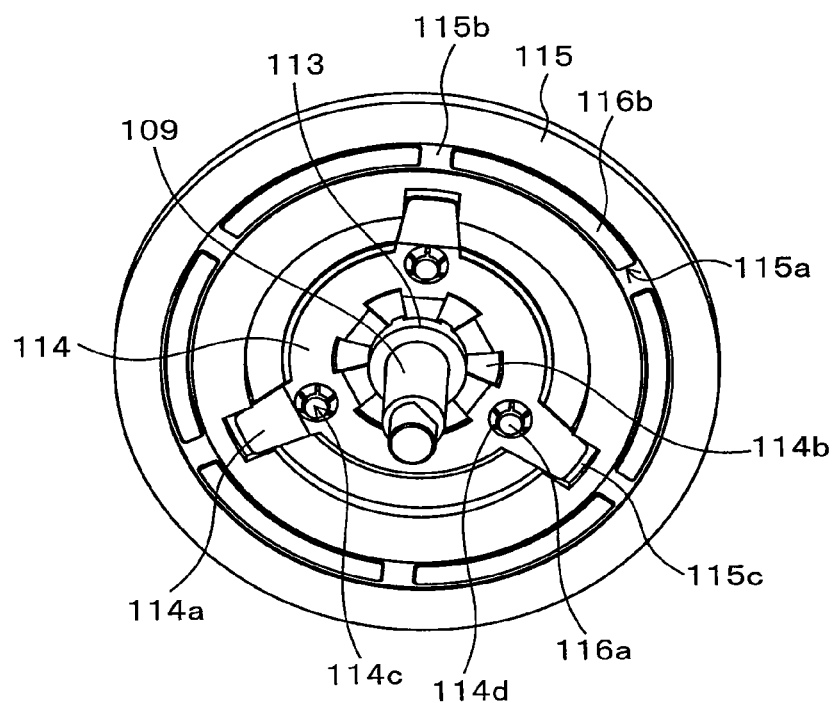
FIG. 2 is a perspective view showing an example of a structure for supporting an armature of the present invention.
Figure 3:
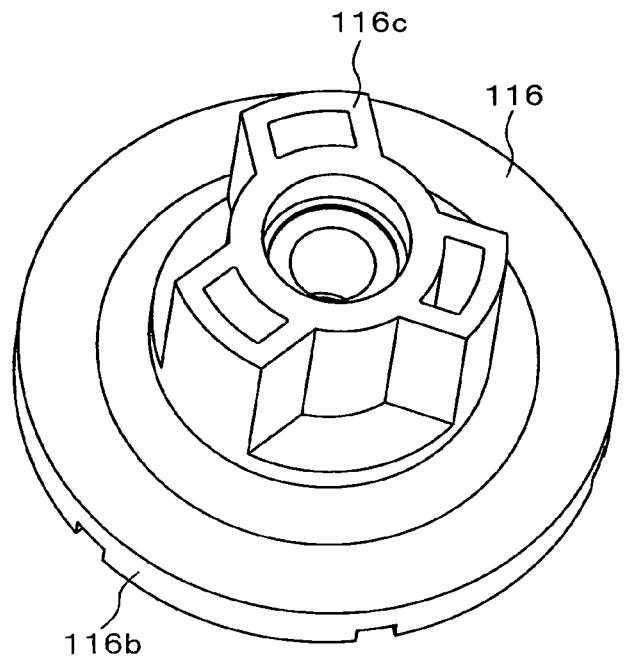
FIG. 3 is a perspective view showing an outline of a driving boss as an example of a rotating member.
Figure 4:
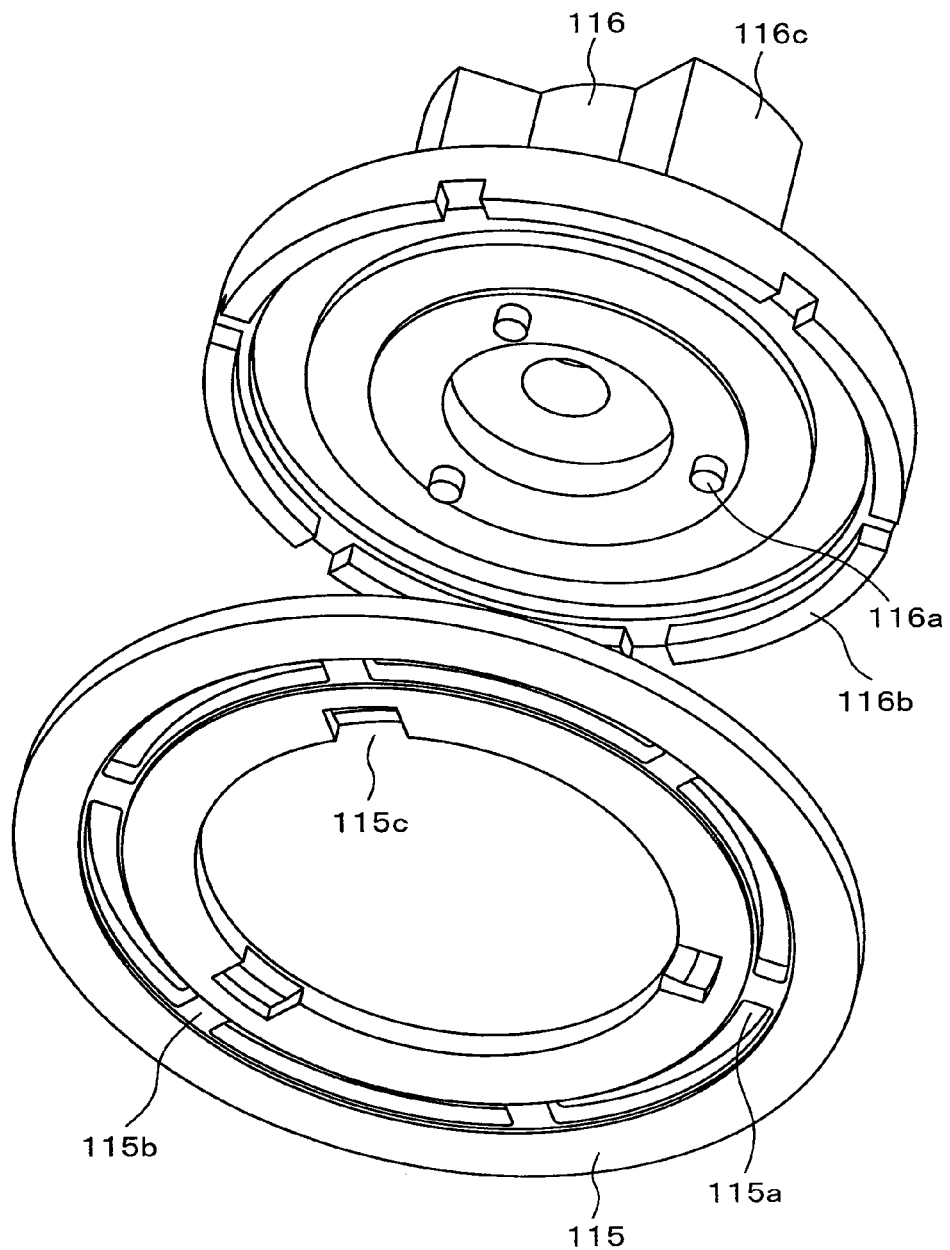
FIG. 4 is an exploded perspective view showing an example of a condition in which an armature is being mounted on a rotating member.

FIG. 2 is a perspective view showing a condition in which a plate spring 114 is fixed to a driving boss 116 (see FIG. 1; not shown in FIG. 2). FIG. 3 is a perspective view showing an appearance of a driving boss 116. FIG. 4 is an exploded perspective view showing a condition in which an armature 115 is being mounted on a driving boss 116.

As shown in FIG. 2, the plate spring 114 has a circular disk shape and comprises three outer claws 114a and six inner claws 114b. The outer claws 114a extend to the outer circumference of the plate spring 114 (in the direction opposite to the center of rotation), and the inner claws 114b extend to the inner circumference of the plate spring 114 (in the direction toward the center of rotation). The number of the claws is not limited to the number shown in the figure, and the claws are preferably disposed at equal angles with respect to the circumferential direction. The plate spring 114 is made of a metal material having an elasticity (for example, a spring steel).

As shown in FIG. 2, the plate spring 114 is formed with holes 114c. A plurality of cuttings 114d are formed in the radial direction at the inner circumference of the holes 114c. The driving boss 116 (see FIG. 1) is a resin molding and is provided with protuberances 116a (see FIG. 4) at a portion corresponding to the holes 114c of a surface which faces the armature 115. The protuberances 116a have a circular cross section in which an outer diameter is larger than the diameter of the inner circumference of the holes 114c. The outer diameter of the protuberance 116a is set to have a size so that when the protuberance 116a is inserted into the hole 114c, the portion formed with the cuttings 114d is deformed.

FIGS. 1 and 2 show an armature 115, and the armature 115 is made of a magnetic material, which is the same as the case of the rotor 111. The armature 115 is formed with a slit 115a that extends in the circumferential direction. The function of the slit 115a is the same as that of the slits 112a and 112b. The slit 115a is divided into several portions by bridge portions 115b (see FIG. 2 or 4) in the circumferential direction. The armature 115 is formed with three recesses 115c for accommodating the outer claws 114a.

As shown in FIGS. 1 and 4, the driving boss 116 is provided with protuberances 116b so as to be fitted with some clearance into the slits 115a of the armature 115. When the armature 115 is joined to the driving box 116, the protuberances 116b are fitted into the slits 115a. According to this structure, a driving force of the armature 115 is transmitted to the driving boss 116. That is, when the armature 115 is rotated, the protuberances 116b fitted into the slits 115a receive the force from the armature 115, whereby the driving boss 116 coupled with the protuberances 116b rotates. This is a driving force transmitting mechanism from the armature 115 to the driving boss 116. Since the protuberances 116b are fitted with some clearance into the slits 115a, the armature 115 can move back and forth in the axial direction by a small distance.

In this structure for a transmitting mechanism, in order to obtain a magnetic function (function for forming a winding magnetic path in a cross section) of the slits 115a, the protuberances 116b should be made of a nonmagnetic material. In this example, the protuberances 116b and the driving boss 116 are integrally molded and are made of a resin material, whereby the above problem does not occur.

FIG. 2 shows a condition in which the shaft member 109 passes through the driving boss 116 (see FIG. 1), and the armature 115 is held between the driving boss 116 and the plate spring 114 by pressing the plate spring 114 to the driving boss 116. Moreover, the shaft member 109 passes through the spacer 113. In this case, the plate spring 114 is fixed to the driving boss 116 (see FIG. 1 or 4) at the portions of the holes 114c by the above push-nut structure.

That is, by pressing the plate spring 114 to the driving boss 116 (see FIG. 1), the protuberances 116a are inserted into the holes 114c (see FIGS. 1 and 2). At that time, the portions formed with the cuttings 114d are deformed, and edges thereof (edges of the inner circumferences of the holes 114c) obliquely contact the protuberances 116a made of a resin. This structure is called a "push-nut structure", and the edges of the inner circumferences of the deformed holes 114c bite into the sides of the protuberances 116a that are pressed into the holes 114c. Therefore, once the plate spring 114 is pressed into the driving boss 116, the plate spring 114 cannot be separated from the driving boss 116 (that is, the plate spring 114 is fixed to the driving boss 116).

As shown in FIGS. 1 and 2, the holes 114c are provided in a circumferential portion that is outside of the inner claws 114b and inside of the outer claws 114a. The plate spring 114 is fixed to the driving box 116 at the portion of the holes 114c, and the outer claws 114a contact the inside of the recesses 115c of the armature 115. That is, the outer claws 114a contact portions at a side of a friction surface (the side of the rotor 111) of the armature 115. The outer claws 114a are parts of the plate spring 114 and are made of an elastic member, whereby the armature 115 is pressed from the side of the rotor 111 (see FIG. 1) to the driving boss 116, and the armature 115 is elastically secured.

In the conditions shown in FIGS. 1 and 2, the vicinities of the ends of the inner claws 114b of the plate spring 114 are pressed by the spacer 113 from the lower side to the upper side of FIG. 1 (that is, in the direction from the rotor 111 to the driving boss 116). That is, the spacer 113 prevents the vicinities of the ends of the inner claws 114b from sliding to the rotor 111. The holes 114c are provided in the circumferential portion between the inner claws 114b and the outer claws 114a, and the plate spring 114 is fixed to the driving boss 116 at the holes 114c. Therefore, by adjusting the length in the axial direction of the spacer 113, the inner claws 114b can be elastically deformed. Since a springback force is generated due to the elastic deformation of the inner claws 114b, in the periphery of the holes 114c, the plate spring 114 presses the driving boss 116 to the upper side of FIG. 1 (to the direction of the pulley 104). That is, the driving boss 116 is biased toward the pulley 104 by the plate spring 114.

The outer claws 114a and the inner claws 114b preferably contact opposing members at the end portions or the vicinities of the end portions thereof from a standpoint of effectively using the elasticity thereof. In this case, the area of the vicinity is defined by an area based on the end portion, in which an elastic support is performed.

As shown in FIG. 1, the driving boss 116 is rotatably mounted on the shaft member 109 through a bearing 117. That is, the armature 115 is integrally connected together with the driving boss 116 and is rotatable around the central axis of the shaft member 109 as the center of rotation.

The driving boss 116 is coupled with the pulley 104 made of a resin. As shown in FIGS. 3 and 4, the driving boss 116 is provided with three protuberances 116c at the side of the pulley 104, and the protuberances 116c protrude in the radial direction. On the other hand, the inside of the pulley 104 (see FIG. 1) is provided with a recess into which the driving boss 116 is fitted, and the inner circumference of the recess is formed so as to engage with the protuberances 116c (not shown in the figure). By engaging the recess with the protuberances, the driving box 116 and the pulley 104 are coupled.

The driving box 116 and the pulley 104 are formed by resin molding, and the protuberances 116c may be formed so as to be a large shape. Therefore, although the driving boss 116 and the pulley 104 are formed by resin molding, a function for transmitting a torque can be sufficiently obtained, that is, strength required for transmitting a driving force is sufficiently obtained. Accordingly, the parts cost of the driving boss 116 and the pulley 104 can be reduced.

In the structure shown in FIG. 1, the outer circumference of the rotor 111 is engaged with a worm wheel 118. The worm wheel 118 comprises a gear portion 118a, which engages with a worm 119, and comprises a cylindrical portion 118b. The inside of the cylindrical portion 118b engages with the outer circumference of the rotor 111. The worm 119 is coupled with a rotating shaft of a motor (or another appropriate power source) (not shown in the figure).

Figure 5:
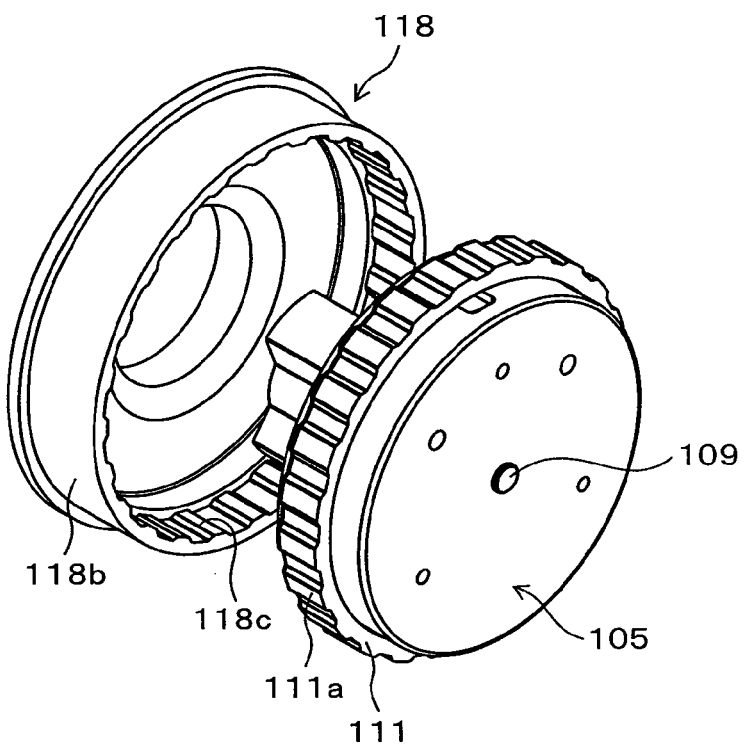
FIG. 5 is an exploded perspective view showing a coupling condition of a rotor and a worm wheel.
Figure 6:
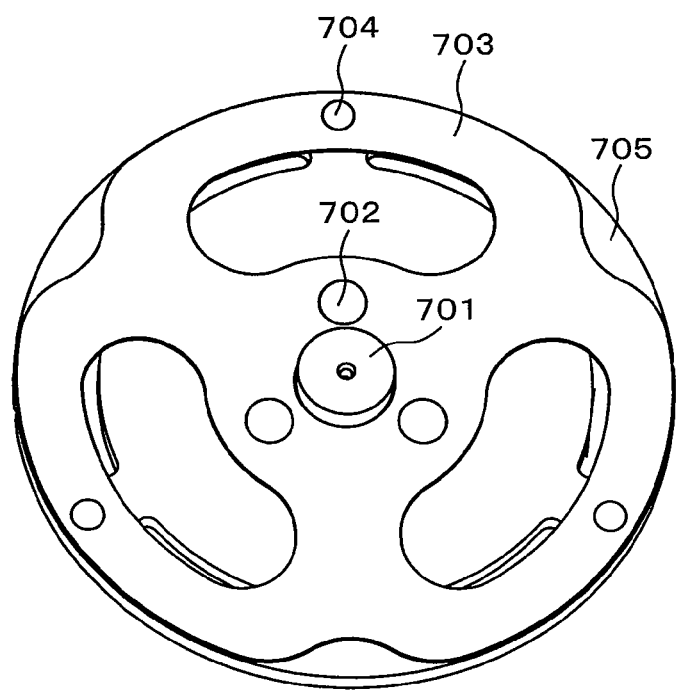
FIG. 6 is a perspective view showing an example of a structure for supporting an armature produced by a conventional technique.

FIG. 5 is an exploded perspective view for describing an engagement condition of the rotor 111 and the worm wheel 118. As shown in FIG. 5, a concave-convex structure 118c is formed periodically on the inner circumference of the cylindrical portion 118b. On the other hand, a concave-convex structure 111a is formed periodically on the outer circumference of the rotor 111. The concave-convex structure 118c on the inner circumference of the cylindrical portion 118b of the worm wheel 118 is brought into engagement with the concave-convex structure 111a on the outer circumference of the rotor 111. Thus, the worm wheel 118 and the rotor 111 are coupled, and a transmitting mechanism of a driving force from the worm wheel 118 to the rotor 111 is thereby formed.

Assembly Procedure

Hereinafter, an example of an assembly procedure of an electromagnetic clutch 100 shown in FIG. 1 will be briefly described. First, a structure shown in FIG. 2 is assembled. A bearing 117 (see FIG. 1) is mounted on a shaft member 109, and a driving boss 116 is fixed to the bearing 117. Alternatively, the bearing 117 is mounted on the driving boss 116, and the shaft member 109 is mounted on the bearing 117. After the shaft member 109 is rotatably mounted to the driving boss 116, an armature 115 is mounted on the driving boss 116 at a positional relationship shown in FIG. 4, and a plate spring 114 is also mounted on the driving boss 116. In this case, positions are adjusted so that protuberances 116a of the driving boss 116 can be inserted into holes 114c of the plate spring 114, and the plate spring 114 is pressed to the armature 115 and the driving boss 116. Then the shaft member 109 is put through the spacer 113. Thus, the condition shown in FIG. 2 is obtained.

Bearings 110 are mounted on the shaft member 109, and a rotor 111 is mounted on the shaft member 109 through the bearing 110. In this case, inner claws 114b (see FIGS. 1 and 2) are pressed toward the driving boss 116 through the spacer 113, and the driving boss 116 is biased toward a pulley 104 (upper direction in FIG. 1) due to the elasticity of the plate spring 114.

A low end (lower end in FIG. 1) of the shaft member 109 is press-fitted into a hole that is formed at the center of the bottom of a housing 105. In this case, a bobbin 107 and an electromagnetic coil 108 are provided in the housing 105 beforehand. Thus, the condition shown in FIG. 5 is obtained, and the rotor 111 is secured to the housing 105.

A worm wheel 118 is coupled with the rotor 111 at a positional relationship shown in FIG. 5. The housing 105 is fixed to a casing (not shown in the figure), and a worm 119 is engaged with a gear portion 118a of the worm wheel 118. Thus, the condition shown in FIG. 1 is obtained.

In this condition, since the driving boss 116 is biased in the upward axial direction of FIG. 1, backlash of the driving boss 116 in the axial direction can be reduced. In addition, this condition can be obtained by mounting parts one after another. The shaft member is not required to pass through a thin annular spacer called a "shim", and the position adjustment of the member in the axial direction is not required. Therefore, the parts cost and the assembly cost can be reduced.

Alternatively, a shaft member, an electromagnetic coil, a rotor assembly (a rotor into which a bearing is press-fitted), and a driving boss assembly (a driving boss assembled with an armature, a spring, and a bearing) may be assembled with respect to a housing in this order.

Operation of Electromagnetic Clutch

In the configuration shown in FIG. 1, when a power device such as a motor (not shown in the figure) is rotated, the worm 119 is rotated by the driving force. This rotation is transmitted to the gear portion 118a, and the worm wheel 118 thereby rotates around the shaft member 109 that functions as the center of rotation. This rotation is transmitted to the rotor 111 by the transmission mechanism shown in FIG. 5, and the rotor 111 thereby rotates.

In this case, when an electric current is not fed to the electromagnetic coil 108, an attracting force is not generated between the rotor 111 and the armature 115, whereby the armature 115 is supported separately from the rotor 111 by an elastic force of the outer claws 114a of the plate spring 114. In this condition, the rotation of the rotor 111 is not transmitted to the armature 115. This condition is the disengagement of the electromagnetic clutch, that is, the electromagnetic clutch is disengaged, and the transmission of a driving force is interrupted.

When an electric current is fed to the electromagnetic clutch 108, the electromagnetic coil 108 generates a magnetic force, and a closed magnetic path is thereby formed around a plate member 105a, an inner cylindrical portion 105b, an outer cylindrical portion 105c, the rotor 111, and the armature 115. By forming the magnetic path, a magnetic attracting force is generated between the rotor 111 and the armature 115. In this case, the magnetic path is formed such that the path is winding between the rotor 111 and the armature 115 because of slits 112a, 112b, and 115a. Therefore, the number of turns of the magnetic path is increased between the rotor 111 and the armature 115, and the magnetic attracting force thereby effectively acts between the rotor 111 and the armature 115.

When the above attracting force acts, the outer claws 114a of the plate spring 114 is elastically deformed by the attracting force, whereby the armature 115 is displaced to the rotor 111, and the armature 115 and the rotor 111 contact each other. A friction force is generated when the armature 115 contacts the rotor 111, and the diving force of the rotor 111 is transmitted to the armature 115 by the friction force. Then, the armature 115 rotates, thereby rotating the driving boss 116 and the pulley 104. Thus, the driving force inputted from the worm 119 is outputted from the pulley 104. The above condition is the engagement of the electromagnetic clutch, that is, the electromagnetic clutch is engaged, and the driving force can be transmitted.

Thus, by controlling an electric current to the electromagnetic coil 108, the engagement and the disengagement of the electromagnetic clutch can be controlled. In addition, by controlling a power (in general, voltage) to the electromagnetic coil 108, a condition called a "half clutch" can be controlled.

Advantages of Embodiment

In the above-mentioned embodiment, a fixing structure such as rivets is not required for mounting the plate spring 114 to the driving boss 116, and for supporting the armature 115 using the plate spring 114. Therefore, the number of the parts can be reduced, and the assembly cost can thereby be reduced. Moreover, since the plate spring 114 is not used for transmitting a driving force, the plate spring may have a compact shape, and the material cost thereof can be reduced.

Since the driving boss 116 is fixed such that the driving boss 116 is urged to be separated toward the pulley 104 due to the function of the plate spring 114, backlash in the axial direction can be reduced without an adjustment using a spacer called a "shim". In this case, the plate spring 114 is employed for elastically supporting the armature 115, whereby the parts cost is not increased. The structure can be obtained by assembling parts one after another, whereby the assembly cost can be decreased.

The shaft member 109 is used as a member for setting the center of rotation, and the shaft member 109 does not rotate (the shaft member 109 is press-fitted into the housing 105) and does not transmit a driving force. Therefore, the shaft member 109 can be obtained at a lower cost, and a member that may be processed at a lower cost can be used therefor. Since the shaft member 109 is not used for transmitting a driving force, members having high strength (sintered members and gear members that require a high processing cost) are not required. The member having high strength is not required to transmit a driving force to a shaft member having a small diameter, or to bring out a driving force from such a shaft member. Specifically, a driving force can be transmitted from the armature 115 to the pulley 104, which is made of a resin molded member, by using the driving boss 116 made of a resin molded member, whereby the production cost can be further reduced.

The cylindrical portion 118b of the worm wheel 118 covers the radial outer side of the friction surfaces of the rotor 111 and the armature 115. Therefore, metal particles generated at the friction surfaces are not easily entered in the gear portion 118a of the worm wheel 118. Accordingly, wear and inappropriate engagement of the engaging portions of the gear portion 118a and the worm 119 (see FIG. 1) may not be caused by the metal particles generated at the friction surfaces.

The inside of the lower portion of the cylindrical portion 118b is engaged with the rotor 111 and is coupled therewith by the concave-convex structure as shown in FIG. 5. That is, concave-convex structure 111a of the rotor 111 and concave-convex structure 118c of the worm wheel 118 are formed so as to be engaged with each other. According to this structure, a gear member, in which the material cost and the processing cost are high, is not additionally required, and a rotor may have a structure that can be produced by forging. Moreover, processing with no high accuracy is required as long as the concave-convex structure 118c engages with the concave-convex structure 111a, whereby the production cost of the worm wheel 118 can be reduced.

(2) Second Embodiment

A driving force is not transmitted through the shaft member 109 in the electromagnetic clutch 100 shown in FIG. 1A, but the present invention may be used for an electromagnetic clutch having a structure in which a driving force is transmitted through a shaft member.

An example of the above case will hereinafter be described. In this example, in the structure shown in FIG. 1, the shaft member 109 is rotatably fixed to the housing 105 through a bearing, and the shaft member 109 is downwardly protruded from the housing 105. In addition, a pulley is mounted on the shaft member 109 that is downwardly protruded from the housing 105. A driving boss 116 is fixed on the shaft member 109 without using the bearing 117.

In this case, when the rotation of the rotor 111 is transmitted to the armature 115, the driving boss together with the shaft member 109 are rotated, and a driving force is thereby outputted through the pulley that is disposed under the housing 105.

(3) Additional Embodiment

As a slide-preventing means, the shaft member 109 may have a diameter-expanded structure or a stepped structure at the portion to be disposed with the spacer 113, so that the inner claws 114b contact the portion. The material of the plate spring is not limited to a metal as long as a plate spring having a required elasticity can be obtained.

The present invention can be used for electromagnetic clutches.

What is claimed is:

1. An electromagnetic clutch comprising:
an innermost shaft member;
a rotor supported so as to be rotatable with respect to said shaft member;
an armature facing said rotor with a clearance;
a device that generates a magnetic attracting force between said rotor and said armature; and
a rotating member supported so as to be rotatable with respect to said shaft member and coupled with said armature through a plate spring
wherein the shaft member does not transmit a driving force during operation of the electromagnetic clutch,
wherein said plate spring extends in a direction opposite to said shaft member and comprises a first end separated from said shaft member,
wherein said first end or a portion in the vicinity of said first end contacts an armature surface facing said rotor, and said plate spring is fixed to said rotating member at a portion other than the portion contacting said armature surface, and
wherein said armature is supported such that said armature is urged to be separated in a direction opposite to said rotor by an elasticity of said plate spring.

2. The electromagnetic clutch according to claim 1, wherein said electromagnetic clutch further comprises a pulley coupled with said rotating member.

3. The electromagnetic clutch according to claim 1, wherein said plate spring comprises a second end at the side of said shaft member, said electromagnetic clutch further comprises a slide-preventing means for preventing said second end or a portion in the vicinity of said second end from sliding to said rotor, and said plate spring is pressed from said rotating member toward said rotor at a portion other than the portions of said first end or the vicinity of said first end and said second end or the vicinity of said second end.

4. The electromagnetic clutch according to claim 1, wherein said armature is provided with a slit around the circumferential direction, and said rotating member comprises a protuberance that engages with said slit.

5. The electromagnetic clutch according to claim 1, wherein said electromagnetic clutch further comprises a worm wheel coupled with said rotor and having a cylindrical member for covering the outer circumferential surface of said clearance between said armature and said rotor.

6. The electromagnetic clutch according to claim 1, further comprising a housing accommodating said device that generates a magnetic attracting force, wherein said shaft member is unrotatably secured to said housing.

* * * * *